United States Patent Office 3,549,567
Patented Dec. 22, 1970

3,549,567
AQUEOUS DISPERSION OF CARBOXYLIC POLYMERS CONTAINING AMINO-SUBSTITUTED AZIRIDINES
George M. Kagan, Rio de Janeiro, Brazil, and Robert Roper, Summit, N.J., assignors to Esso Research and Engineering Company, a corporation of Delaware
No Drawing. Filed Mar. 14, 1968, Ser. No. 712,917
Int. Cl. C07d 23/06; C08f 45/24
U.S. Cl. 260—29.6
4 Claims

ABSTRACT OF THE DISCLOSURE

An aqueous coating composition or adhesive, prepared by reacting the copolymerization product of a vinyl monomer such as vinyl acetate, vinyl chloride, ethyl acrylate, dibutyl fumarate, ethylene, or styrene and an alpha, beta-olefinically unsaturated carboxylic acid with an amino-substituted aziridinyl compound such as N(2-aminoethyl) aziridine.

BACKGROUND

It is known that polymeric latices and solutions for laminating and coating articles made from wood, fabric, plastics, metals, etc., can be made from many different polymers. Latex adhesives and coating compositions are preferred over the solution-type compositions by many laminators, painters and manufacturers of coated articles for reasons well known in the art. For example, the use of water instead of a volatile organic solvent as the liquid phase not only reduces material and equipment costs but also reduces such application problems as toxicity, fire hazard, noxious odors, difficulty of clean-up, damage to solvent-sensitive substrates, limited solubility of high molecular weight polymers, and excessive viscosity at high polymer solids content.

Although many useful coating and laminating compositions for fabrics, paper and man-made leather have been made from carboxylic polymer latices, the dry-film adhesion of these compositions to various substrates is not entirely satisfactory for many applications. Another limitation is the serious loss in adhesion and abrasion resistance of the dried film when the coated or laminated article is subjected to contact with water. This problem can be minimized by using much less than the normal amount of surfactant in the latex, but only at a sacrifice in latex stability. This problem has been overcome in part by reacting an alkylene imine or aziridine compound with latices of carboxylic polymers as disclosed in U.S. Pat. Nos. 3,261,796; 3,261,797 and 3,261,799. However, the adhesion effected through the use of these compounds leaves much to be desired.

SUMMARY

Therefore, according to this invention the adhesion of the latices of carboxylic polymers is vastly improved over the results obtained in the above patents by substituting amino-substituted aziridinyl compounds for the unsubstituted compounds set forth in the above patents.

Expressed broadly, the novel product of this invention is a latex of a vinyl addition polymer having attached to the carbon-carbon chain monovalent aminoester radicals of the following formula:

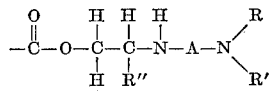

where R is H, $CH_3$ or $C_2H_5$, R' is H, or an aliphatic group ranging from $C_1$ to $C_4$, or an alicyclic group ranging from $C_5$ to $C_8$, or an aliphatic group ranging from $C_1$ to $C_4$ to which a $C_5$ to $C_6$ nitrogen containing alicyclic or aromatic ring is attached, such as a 2(4-pyridinyl) ethyl group. R" is H, $CH_3$, or $C_2H_5$, A is a $C_2$ to $C_8$ aliphatic, alicyclic, or aromatic divalent group, or a group with the structure $-(C_mH_{2m}NH)_kC_nH_{2n}-$, where $m=2-3$, $n=2-3$, and $k=1-4$. Typical A groups are $-(CH_2)_2-$; $-(CH_2)_4-$;

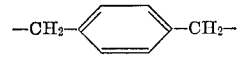

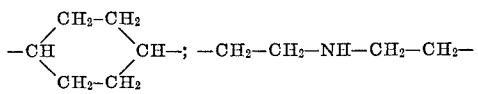

etc.

Preferred structures are those where R=R'=H, R"=H or $CH_3$ and $A=-(CH_2)_n-$ where $n$ is 2–6 or $-(C_2H_4NH)_n-C_2H_4-$ or $-(C_3H_6NH)_n-C_3H_6$ where $n$ is 1–4.

SPECIFIC EMBODIMENTS

Carboxylic polymers are an important class of polymers used by the adhesive and coating composition industries.

"Carboxylic polymer" herein designates a substantially water-insoluble interpolymer containing pendant carboxylic acid groups (—COOH), or salts thereof (e.g. —COONH$_4$). Such an interpolymer is the product of reacting at least one monomer containing both a carboxylic acid group (or equivalent source of carboxyl groups) and polymerizable olefinic unsaturation with at least one other monomer copolymerizable therewith.

Specifically the carboxylic polymers of this invention are prepared by reacting the following two classes of compounds.

*Type I.*—Noncarboxylic vinyl monomer: any olefinically unsaturated monomer that can be copolymerized by known methods of emulsion polymerization with carboxylic acid monomers (Type II, below), e.g. vinyl acetate vinyl propionate, acrylate or methacrylate esters (such as ethyl acrylate, butyl acrylate, 2-ethylhexyl acrylate, or methyl methacrylate), vinyl chloride, vinylidene chloride, acrylonitrile, ethylene, styrene, butadiene, isobutylene, diethyl maleate, dibutyl maleate, dibutyl fumarate, ethyl vinyl ether, butyl vinyl ether, ethyl vinyl ketone.

*Type II.*—alpha, beta-olefinically unsaturated mono- or dicarboxylic acids, that can be copolymerized by known methods of emulsion polymerization. E.g. acrylic, methacrylic, crotonic, cinnamic, itaconic, angelic, maleic, fumaric acids, monoethyl fumarate, monobutyl maleate, maleamic acid, fumaramic acid, crotonic acid, cinnamic acid, angelic acid, sorbic acid.

The polymerization is carried out by dispersing the monomers in water in the presence of a suitable emulsifying agent and, after the addition of a suitable polymerization catalyst, heating until the polymerization is completed. Suitable emulsifying agents are the polyethoxylated alkyl phenols such as ethoxylated octyl phenol; potassium oleate; sodium lauryl sulphate; and sodium alkyl benzene sulfonates. Suitable catalyst systems employed in preparing the polymers of this invention are ammonium, sodium, or potassium persulfate; a peroxide, such as hydrogen peroxide; a diazo compound, such as azobisisisobutyramidine hydrochloride; or a redox catalyst such as potassium persulfate in combination with either benzoin or sodium metabisulfite.

The conditions under which the polymerization reaction is conducted can vary over a wide range. Generally, temperatures ranging from —5° C. to 100° C. can be used; however, temperatures ranging from 20° C. to 90° C. are preferred. Pressures ranging from 15 to 250 p.s.i. can be employed in the polymerization reaction; however, pressures in the range of from about one atmosphere to 50 p.s.i. are more commonly used. The reaction times used in the formation of the polymers depend in general upon the temperature used. Generally, reaction times ranging from 3 to 120 hours are employed; however, it is more usual to use reaction times ranging from 4 to 24 hours. The resulting carboxylic polymer has 0.05 to 20% by weight of monomer units containing pendant carboxyl groups.

Typical of the methods known in the art for preparing emulsion polymers suitable for this invention are those set forth in U.S. Pat. Nos. 2,795,564; 3,314,908; 2,147,154; 2,724,707; and 3,032,521.

The carboxylic monomer is used in the proportion of 0.05 to 20%, preferably 0.10 to 5.0% while the non-carboxylic monomer is used in the proportion of 99.95 to 80%, preferably 99.9 to 95% by weight.

Polymers should have number average molecular weights between 20,000 and 5,000,000, preferably over 50,000. The emulsions contain 40 to 65% solids, preferably 45 to 60%.

The amino-substituted aziridinyl compounds useful in this invention are defined by the following formula structure:

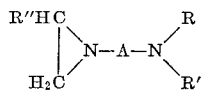

where R, R', R", and A are defined as above.

Typical aziridinyl compounds of this invention are the following:

N(2-aminoethyl) aziridine
N(4-aminobutyl) aziridine
N[3(methylamino) propyl] aziridine
N[3(tert-butylamino) propyl] aziridine
1(4-aminocyclohexyl)-2-methyl aziridine
α(N-aziridyl)α'(methylamino) xylene:

N[3(N-aziridyl) propyl] 1,3-propylene diamine:

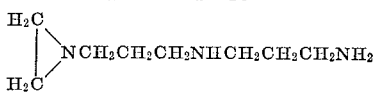

N[2(N-aziridyl) ethyl]N'(2-aminoethyl) ethylenediamine

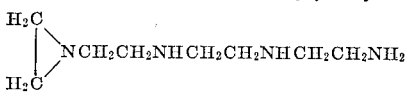

N[3(N-aziridyl)propyl]p-toluidine:

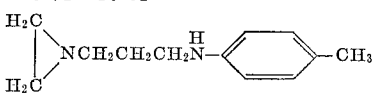

β[N(2-methylaziridyl)]β'(4-pyridyl) diethylamine:

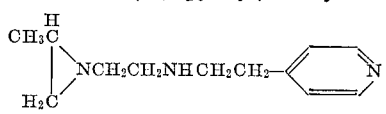

2[N(2-methylaziridyl)]N(2-aminopropyl) isopropylamine:

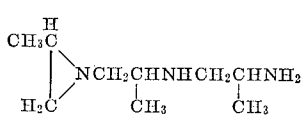

The amino-substituted aziridinyl compounds useful in this invention may be prepared by utilizing the procedures outlined in the articles by H. Bestian, Annalen der Chemie, vol. 566, p. 210 et seq. (1950) and G. D. Jones et al., J. Organic Chemistry, vol. 9, p. 125 et seq. (1944).

The polymer emulsion is treated with the aziridinyl compound and reacted with it. The aziridinyl compound is added under agitation, and the mixture is then heated to about 20° C. to 90° C., while under agitation, and held at same temperature in this range from three minutes to four hours, preferably from five to thirty minutes. Alternatively, the emulsion is first heated to the desired temperature, then the aziridinyl compound added and the mixture agitated at that temperature for three minutes to four hours.

The latex should have a pH of below 7 before aziridinyl addition, preferably between pH 3 to 6 and after aziridinyl addition the pH should be between 5 and 10.

The aziridinyl compound is mixed with the polymer in proportions of 0.01 to 5 equivalents per carboxyl group, preferably 0.1 to 2.0 equivalent.

By this procedure, the aziridinyl groups of the added compound react with the free carboxyl groups of the polymer to form pendant aminoester groups, the general structure of which is shown above.

The latexes produced by this invention have outstanding adhesion, especially under moist or wet condition, when used as coatings, adhesives, or laminating agents. Interior and exterior coating compositions prepared from these latexes have excellent adhesion to a variety of substrates, for example bare wood, primed wood, wood coated with glossy enamel, metals such as steel or aluminum, and masonry. Because of their outstanding adhesion under wet conditions, these coatings show excellent resistance to peeling, flaking, and blistering.

Another advantage of this invention is the low level of amino-substituted aziridinyl compound required to produce high levels of wet adhesion, as compared to aziridinyl compounds containing no amino groups. This reduces the cost of modification of the latex polymer, and also reduces any undesirable effects that might be exerted on the latexes by high levels of aziridinyl compounds, such as storage stability, mechanical stability, and discoloration of the latex or coatings prepared with the latex.

The examples which follow are given for the purpose of illustrating the invention. All quantities shown are on a weight basis unless otherwise indicated.

EXAMPLE 1

An emulsion polymerization was carried out according to the following recipe:

Vinyl acetate—975 g.
Butyl acrylate—250 g.
Monoethyl fumarate—25 g.
Dist. water—1023.4 g.
Igepal CO 630[a]—47.1 g.
Igepal CO 997[b]—27.6 g.
2% aq. NaOH—112.5 ml.
5% aq. $K_2S_2O_8$—50.0 ml. (catalyst solution)

[a] Ethylene oxide adduct of nonylphenol containing 9 to 10 ethylene oxide units per molecule, 100% active.
[b] Same as above, but containing 50 ethylene oxide units per molecule, 70% active.

A 5-liter, 4-neck flask equipped with water-cooled condenser, stirrer, dropping funnels for addition of monomers and catalyst, thermometer, and a heated water bath, is charged with the water and Igepal surfactants, and 97.5 g. vinyl acetate and 25 g. butyl acrylate are added after the aqueous solution is brought to 70° C. 25 ml. catalyst solution is added, and temperature is raised to 75° C. The remaining monomer (877.5 g. vinyl acetate, 225 g. butyl acrylate, and 25 g. monoethyl fumarate) is added gradually over a period of 2.5 hours, together with the NaOH solution. The temperature is then raised to 80° C. over a forty minute priod, and held at this point for another twenty minutes. During this one hour period the rest of the catalyst solution is gradually added. The reaction is then allowed to cool. After cooling, the resultant polymer emulsion contained 50% nonvolatile matter, had a pH of 4.85, and a Brookfield viscosity of 60 cp. at 12 r.p.m., No. 2 spindle. The polymer contained 1.95% monoethyl fumarate by weight.

An emulsion made by the above procedure was divided into 100 g. portions, and each portiton heated at 50° C., a given amount of aziridinyl compound added, and stirred for five minutes.

The following emulsions were prepared by the above procedure:

| Aziridinyl compound added | Equivalents aziridinyl per carboxyl group | Grams aziridinyl compound per 100 g. polymer solids |
|---|---|---|
| Emulsion No.: | | |
| 1 — N(2-aminoethyl) aziridine | 0.25 | 0.30 |
| 2 — N(4-aminobutyl) aziridine | 0.25 | 0.40 |
| 3 — tris(1-aziridinyl) phosphine oxide | 0.25 | 0.20 |
| 4 — Propylenimine | 0.25 | 0.20 |
| 5 — N(3-hydroxypropyl) aziridine | 0.25 | 0.40 |
| 6 — N(2-aminoethyl) aziridine | 0.125 | 0.16 |
| 7 — N(4-aminobutyl) aziridine | 0.125 | 0.20 |
| 8 — None | | |

In this example, emulsion Nos. 1, 2, 6, and 7 were treated with the aziridinyl compounds of this invention. The other emulsions are shown for comparison.

Paints were prepared from these emulsions by mixing 47.7 g. emulsion with 51.1 g. pigment paste, 4.4 g. of a 1.5% aqueous solution of hydroxyethyl cellulose, and 7.0 g. water. The pigment paste was prepared by grinding the following in a Cowles Dissolver; 75 g. water, 20 g. ethylene glycol, 1.0 g. potassium tripolyphosphate, 4.0 g. of a polyoxyethylated octyl phenol containing 9 to 10 ethylene oxide units per molecule, 4.0 g. of a 25% aqueous solution of sodium polyacrylate, 225 g. Rutile $TiO_2$, 102 g. calcium carbonate, 3.0 g. phenylmercuric acetate containing 18% mercury, 2.0 g. defoamer, and 75 g. 1.5% aqueous solution of hydroxyethyl cellulose.

Two coats of the paints were brushed out on cedar panels that had been coated with a trim and shutter alkyd enamel. After the emulsion paints dried overnight, the panels were placed in a fog cabinet for fifteen minutes at 95° F., 100% relative humidity. After removal, they were scraped with a spatula to test adhesion while wet, and rated from 0 to 10, 0=complete failure, 10=excellent (no film could be scraped off).

The results are shown in the following table:

| Emulsion No. | Wet adhesion rating |
|---|---|
| 1 | 10 |
| 2 | 10 |
| 3 | 4 |
| 4 | 4 |
| 5 | 3 |
| 6 | 8 |
| 7 | 6.5 |
| 8 | 2 |

It may be seen from these results that the aziridinyl compounds of this invention give outstanding adhesion under wet conditions, while other aziridinyl compounds, at the same equivalent concentration, give only poor to fair adhesion. Even at a concentration of 0.125 equivalents aziridinyl per carboxyl group, the aminoaziridinyl compounds (emulsion numbers 6 and 7) exhibit good adhesion, while at twice this concentration the other emulsions tested were only poor to fair.

EXAMPLE 2

An emulsion polymerization was carried out according to the recipe given in Example 1, but reducing Igepal CO 977 to 22.0 g. and reducing monoethyl fumarate to 12.5 g. Instead of a 2% aqueous sodium hydroxide solution, a 1% solution was used, at the same volume level.

A similar procedure was followed as in Example 1, giving a polymer emulsion containing 50.7% nonvolatile matter, a pH of 4.8, and a Brookfield viscosity of 47.5 cp. at 12 r.p.m., No. 2 spindle. The polymer contained 0.95% monoethyl fumarate by weight, which is half of that contained by the emulsion of Example 1.

The latex was divided into 100 ml. portion, and each portion heated to 50° C., a given amount of aziridinyl compound was added, and stirred for five minutes.

Paints were prepared and tested by the same procedure described in Example 1. The results are shown in the following table. Wet adhesion was rated from 0 to 10, 0=complete failure, 10=excellent (no film could be scraped off).

| Aziridiny compound added | Equivalents aziridinyl per carboxyl group | Grams aziridinyl compound per 100 g. polymer solids | Wet adhesion rating of paint |
|---|---|---|---|
| Emulsion No.: | | | |
| 9 — N(2-aminoethyl)-aziridine | 0.5 | 0.30 | 0 |
| 10 — N(4-aminobutyl)-aziridine | 0.5 | 0.40 | 9 |
| 11 — (N2-aminoethyl)-aziridine | 0.25 | 0.16 | 8.5 |
| 12 — N(4-aminobutyl)-aziridine | 0.25 | 0.20 | 8 |
| 13 — Propylenimine | 0.5 | 0.20 | 4 |
| 14 — 3(N-aziridyl)-butyraldehyde azine | 0.5 | 0.40 | 3 |

It may be seen from these results that the amino-aziridinyl compounds give outstanding adhesion when reacted with a vinyl acetate-butyl acrylate copolymer containing 0.95% monoethyl fumarate. In comparison, the aziridinyl compounds not containing amino groups (emulsions 13 and 14) show only poor-fair adhesion.

EXAMPLE 3

A vinyl acetate-butyl acrylate-monoethyl fumarate emulsion was prepared similar to that described in Example 1. N[3(tert-butylamino)propyl] aziridine was added to this emulsion at a level of 0.25 equivalent aziridinyl per carboxyl group by the same procedure described in Example 1. As in this example, the emulsion was formulated into a paint and tested. It exhibited good wet adhesion.

EXAMPLE 4

Example 3 was repeated, substituting N[3-(methylamino)propyl] aziridine for the aziridine compound used in that example. The resulting paint exhibited good wet adhesion.

EXAMPLE 5

Example 3 was repeated, substituting N[3(N-aziridyl)propyl] 1,3-propanediamine for the aziridine compound used in that example. The resulting paint exhibited good wet adhesion.

EXAMPLE 6

Example 3 was repeated, substituting N[3(N-aziridyl) propyl] aminoethylpiperazine for the aziridine compound used in that example. The resulting paint also exhibited good wet adhesion.

The nature of the present invention having thus been fully set forth and examples of the same given, what is claimed as new, useful and unobvious and desired to be secured by Letters Patent is:

1. An aqueous dispersion suitable for use as a coating composition consisting essentially of a latex of a vinyl addition polymer prepared by the copolymerization of a monomer selected from the group consisting of vinyl acetate, vinyl propionate, ethyl acrylate, butyl acrylate, 2-ethyl-hexyl acrylate, methyl methacrylate, vinyl chloride, vinylidene chloride, acrylonitrile, ethylene, styrene, butadiene, isobutylene, diethyl maleate, dibutyl maleate, dibutyl fumarate, ethyl vinyl ether, butyl vinyl ether, and ethyl vinyl ketone, with a monomer selected from the group consisting of acrylic acid, methacrylic acid, crotonic acid, cinnamic acid, itaconic acid, angelic acid, maleic acid, fumaric acid, monoethyl fumarate, monobutyl maleate, maleamic acid, fumaramic acid, and sorbic acid having attached to the polymer carbon-carbon chain, monovalent radicals of the formula:

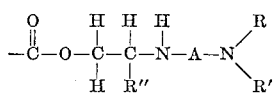

wherein, (a) R and R″ are each selected from the group consisting of H, —CH$_3$ and —C$_2$H$_5$;

(b) R′ is selected from the group consisting of H, a C$_1$ to C$_4$ monovalent acyclic hydrocarbon radical and a C$_5$ to C$_8$ monovalent alicyclic hydrocarbon radical;

(c) A is selected from the group consisting of a divalent C$_2$ to C$_8$ acyclic, alicyclic or aromatic hydrocarbon radical and a group with the structure —(C$_m$H$_{2m}$NH)$_k$C$_n$H$_{2n}$—, where $m=2-3$, $n=2-3$, and $k=1-4$.

2. The composition of claim 1 in which R, R′ and R″ are hydrogen and A is —(CH$_2$)$_2$—.

3. The composition of claim 1 in which R, R′ and R″ are hydrogen and A is —(CH$_2$)$_4$—.

4. The composition of claim 1 in which R, R′ and R″ are hydrogen, and A is —(CH$_2$)$_3$—NH—(CH$_2$)$_3$—.

References Cited

UNITED STATES PATENTS

| | | | |
|---|---|---|---|
| 3,261,796 | 7/1966 | Simms | 260—29.6(H) |
| 3,261,797 | 7/1966 | McDowell et al., I | 260—29.6(H) |
| 3,261,799 | 7/1966 | Vermont | 260—29.6(HN) |
| 3,282,879 | 11/1966 | Werner, Jr. | 260—29.6(HN) |
| 3,309,331 | 3/1967 | McDowell et al., II | 260—29.6(HN) |
| 3,386,939 | 6/1968 | Mesec | 260—29.6(HN)(UX) |
| 3,453,242 | 7/1969 | Schmitt et al. | 260—2(EN) |

OTHER REFERENCES

J. Organic Chem., March 1944, pp. 125–147, The Polymerization of Ethylenimine by Griffin Jones et al.

J. Organic Chem., vol. 9, 1944, pp. 484–499, The Polymerization of Homologs of Ethylenimine by Griffin Jones.

JULIUS FROME, Primary Examiner

J. B. LOWE, Assistant Examiner

U.S. Cl. X.R.

260—2, 239